Aug. 10, 1948.  G. E. TONER  2,446,968
GRAIN TRIMMER
Filed Nov. 23, 1945  2 Sheets-Sheet 1
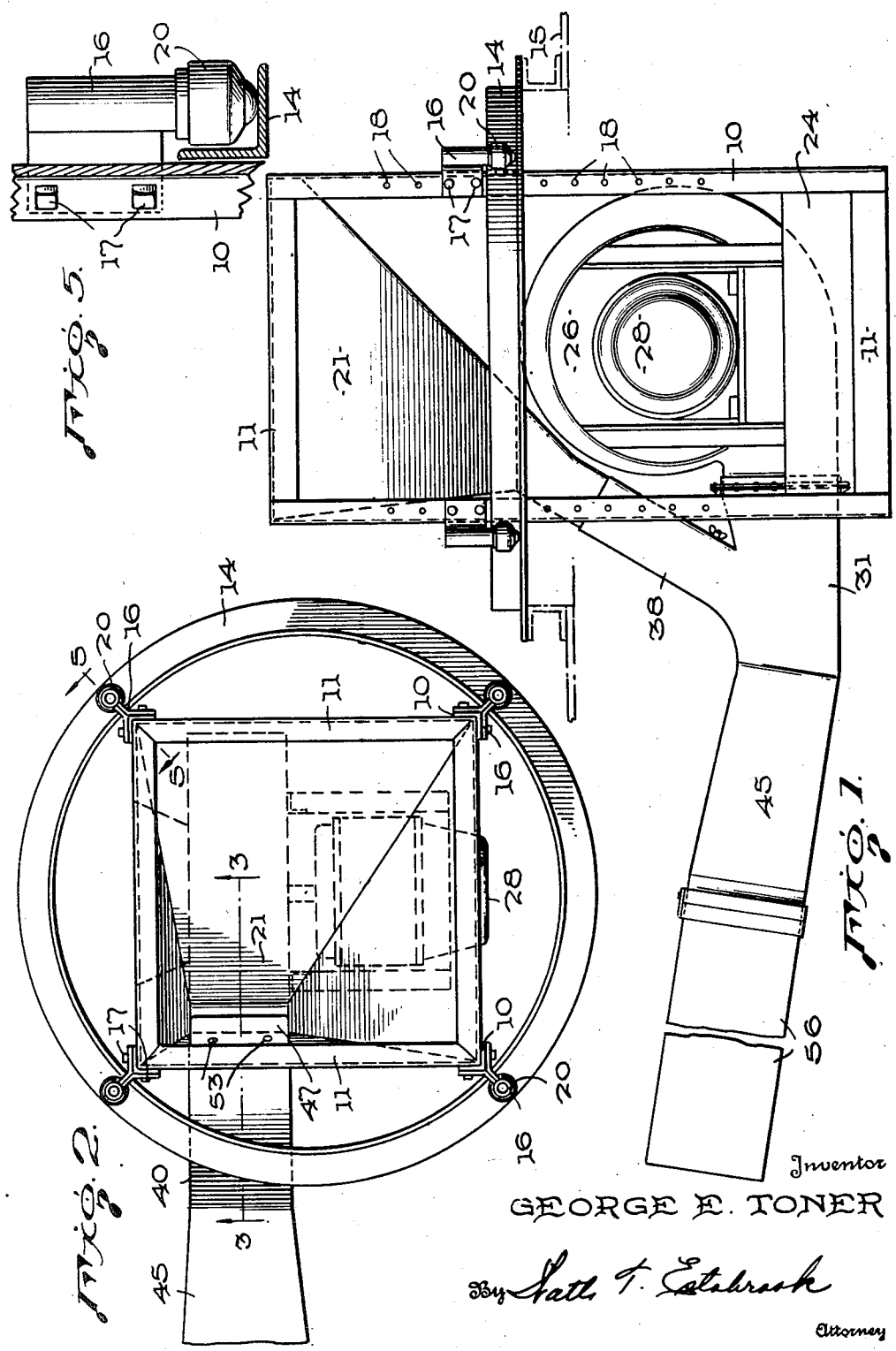
Inventor
GEORGE E. TONER
By Nath. T. Estabrook
Attorney Aug. 10, 1948.  G. E. TONER  2,446,968
GRAIN TRIMMER Filed Nov. 23, 1945  2 Sheets-Sheet 2

Inventor
GEORGE E. TONER
By Nath T. Estabrook
Attorney

Patented Aug. 10, 1948

2,446,968

UNITED STATES PATENT OFFICE 2,446,968

GRAIN TRIMMER

George E. Toner, Philadelphia, Pa., assignor to Benjamin H. Sobelman, Philadelphia, Pa.

Application November 23, 1945, Serial No. 630,526

3 Claims. (Cl. 302—36)

The invention relates to an improvement in grain trimmers, and particularly to that type employed in loading grain into the holds of vessels, and other grain storage chambers.

The invention consists in providing an apparatus that may be mounted on the deck of a vessel and lowered through a hatch into the hold of a vessel and moved on its support for directing the grain to all parts and corners of the hold.

An object of the invention is to provide a hopper and a high speed blower or fan for the delivery of grain and air, respectively, to a manifold whereby the grain is maintained in a state of suspension by the air current in the manifold and conducted therefrom, in such a state, by a conduit associated with the manifold to all parts of the storage chamber without injury to the grain. It is a purpose of this invention to eliminate any possibility of the grain being damaged during the storing operation, such as allowing the grain to become packed or jammed in the manifold or conduits.

The invention consists of certain novel features of construction and combinations of parts which will be hereinafter described and pointed out in the claims.

In the accompanying drawings:

Figure 1 is a view in side elevation of the invention;

Figure 2 is a top plan view;

Figure 5 is a detail view partly in section showing the manner of supporting the frame on the annular track.

Figures 3, 4:
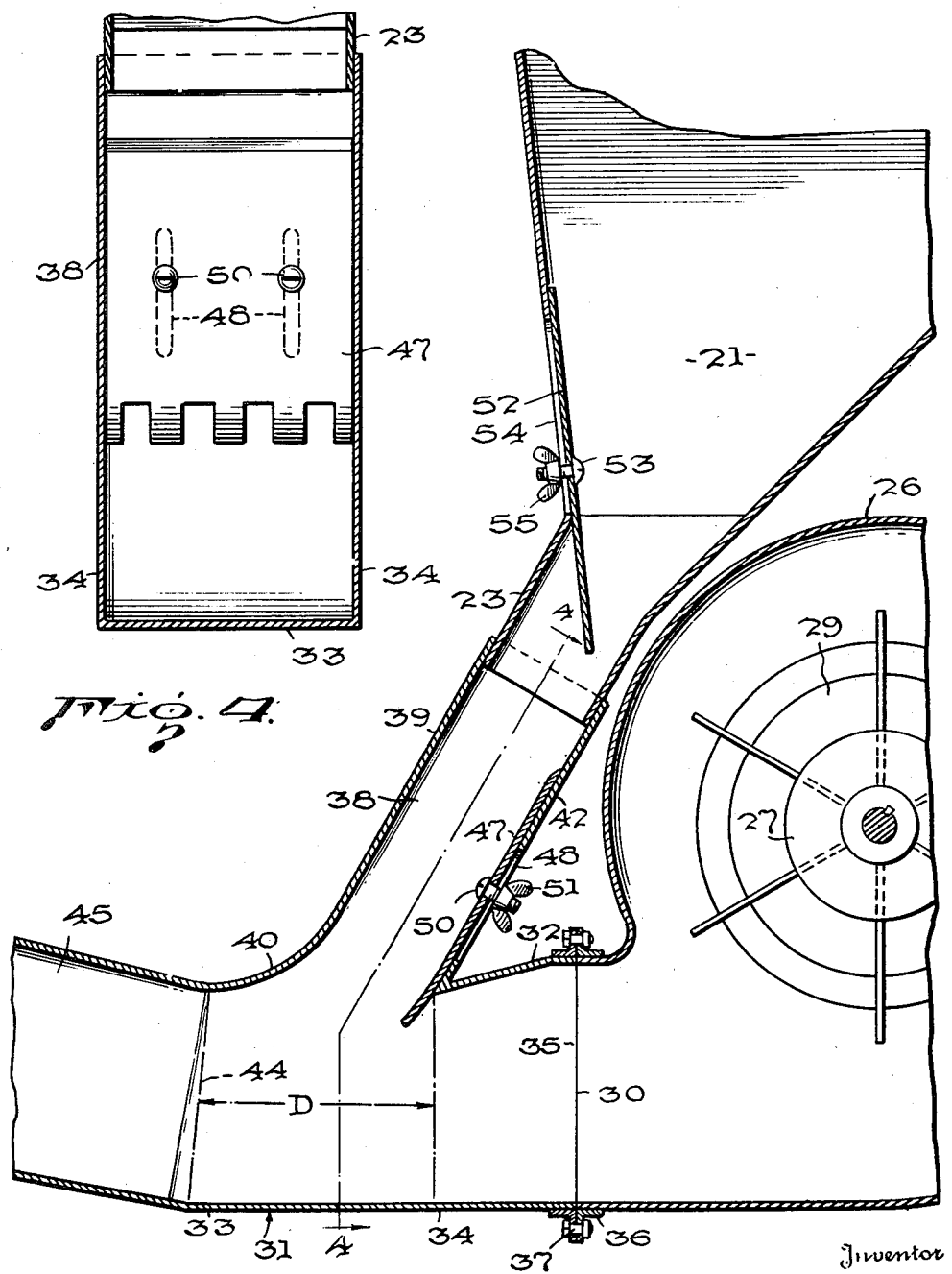
Figure 3 is a detail view in vertical section of the hopper, fan casing and manifold.
Figure 4 is a detail sectional view on line 4—4 of Figure 3.

The general method of loading grain in holds of vessels is by hand labor, and it is the purpose of this invention to eliminate this costly process by substituting an apparatus which can be installed in the hold of a vessel and elevated and rotated to meet the conditions of fully loading the hold so that the grain will be stowed against shifting and producing pockets that would tend to permit the grain to shift in the hold.

A suitable metallic skeleton frame, consisting of four angle iron posts 10, 10 connected together by cross rails 11, 11 is mounted on an annular track 14 supported on a deck 15 of a vessel. Brackets 16, 16 are connected to the four posts 10 by means of pins or bolts 17, 17 passing through holes 18, 18 in the posts. A series of holes 18 is provided in each post so that the brackets may be positioned on the posts and frame at different elevations for supporting the frame at different levels in the hold to accommodate the trimmer to various types of vessels. The brackets 16 are each provided with a roller or wheel 20 which is mounted for travel on the angle ring track 14, and for supporting the frame in the hatch opening of the hold.

A preferably rubber lined hopper 21 is supported on the frame between the posts 10, and is provided with a tapered bottom from which extends an outlet spout or nozzle 23, which is inclined downwardly in a direction between two of the posts 10.

Mounted beneath the hopper 21 on a platform 24 is a high capacity blower comprising a fan casing 26, in which is mounted a fan 27 driven by a suitable motor 28. The fan casing is provided with an axial intake opening 29 and a peripheral outlet opening or duct 30.

A manifold 31, preferably of substantially rectangular conformation, consists of top, bottom and side walls 32, 33 and 34, respectively, and the rear end of the manifold 31 is connected to the fan casing outlet duct 30 by a duct 35. The ends of the fan casing 26 and manifold 31 for forming communication between the ducts 30 and 35 are connected together by couplings 36 and bolts 37.

Extending upwardly from the top wall 32 of the manifold and at an incline is a conduit 38 which has a sliding fit with the spout 23 of the hopper. The upper wall 39 of conduit 38 is curved outwardly at 40 prior to its merging into the top wall 32 and at the discharged end of the manifold 31. The rear wall 42 of the conduit 38 merges into and joins the top wall 32 at a point below the outer or rear end of the wall 32 where it joins the fan casing 26. The top wall 32 has a gradual taper or downward inclination from the fan casing 26 to a point where it is joined by the rear wall 42 of the conduit 38.

The manifold 31 has a greater diameter at the intake end of the duct 35 and gradually diminishes in diameter to about the point where the rear wall 42 of the conduit 38 joins the top wall 32 and from this point to the discharge end 44 of the manifold the diameter of the manifold remains substantially constant, as indicated by the dot and dash lines D of Figure 3. From the discharge end 44 of the manifold a discharge conduit 45 is provided which has a gradually increasing diameter to the outlet end thereof.

The conduit 38 has a diameter much less than the diameter of the manifold 31, and preferably is only slightly more than half the diameter of the manifold, however, it is to be understood these dimensions may be modified in obtaining the desired results.

The manifold 31 provides a zone between the dot and dash lines D, or between the discharge end 44 of the manifold and the approximate point where the inclined top wall 32 and wall 42 are joined, which comprises a chamber wherein the grain and air are joined or mixed, and as this area in cross-section, is greater than that of conduit 38, the grain will be sustained by the air current entering from the fan casing 26. The volume of air delivered to the mixing chamber of the manifold 31 is greater than the volume of grain from the conduit 38, because the intake duct 35 of the manifold and outlet duct 30 of the fan casing are of greater diameter than the mixing chamber zone and the diameter of the conduit 38. As the duct 35 has its upper wall 32 inclined inwardly producing a constriction or venturi at the entrance to the mixing zone, the pressure and velocity of the air stream delivered by the fan 27 will be increased from that of the air stream delivered by the duct 30. The air stream is adequate to maintain the grain in a state of suspension in the mixing chamber of the manifold and in the discharge conduit 45, and as this conduit 45 increases in diameter throughout its length there is no congesting or packing of the grain ahead of the air stream in the mixing chamber or the conduit 45 which would be injurious to the grain.

A damper 47 is mounted on the back wall 42 of conduit 38 and is capable of being moved into the manifold 31 for creating a greater constriction in the passage of air from the fan to the mixing chamber of the manifold. The wall 42 is provided with slots 48 through which screws 50, attached to the damper extend and thumb nuts 51 are applied to these screws 50 for retaining the damper in position.

Another damper 52 is applied to the hopper 21 and is adjustably mounted thereon by means of screws 53 passing through slots 54 in a wall of the hopper 21 and held in adjusted position by thumb-screws 55 applied to the screws 53 for regulating the flow of grain from the hopper through the spout 23.

As shown, the manifold and conduits 38 and 45 are constructed as a unit so that the unit may be readily assembled with the fan casing 26 and hopper 21. In some instances the conduit 45 may require an additional length and this may be provided with the extension 56.

The annular ring track 14 affords a support for the frame consisting of the hopper, fan casing and manifold. The frame may be raised and lowered into the hold of a vessel and retained in its adjusted position by the brackets 16 and rollers 20 and the frame can be rotated on the track to present the discharge conduit 45 to different positions in the hold so that the grain may be directed to all parts of the hold and to evenly fill the hold against the possibility of the grain shifting therein.

What I claim is:

1. In a grain trimmer, the combination of a skeleton frame adapted for insertion and movement within the hold of a vessel, a grain hopper supported on said frame, and provided with a downwardly inclined outlet spout, a fan casing mounted on said frame beneath said hopper having a peripheral outlet duct, a manifold disposed at one side of said frame having an air intake duct at one end and a discharge conduit at the opposite end thereof, said manifold having a mixing chamber disposed adjacent said air intake duct and in proximity to said fan casing outlet duct, means for connecting said air intake duct of said manifold to said fan casing outlet duct for supporting said manifold on said frame, an inclined grain duct extending upwardly from said manifold at said mixing chamber and having a telescopic fit with said hopper outlet spout for delivering of grain to said mixing chamber, means disposed in said manifold adjacent the air intake end of said mixing chamber for producing a venturi in said manifold, and a high capacity fan in said fan casing for moving air at high speed through said venturi of said manifold for creating a suction to draw the grain into said mixing chamber and conveying the grain from the mixing chamber and manifold through said manifold discharge conduit.

2. In a grain trimmer, the combination of a skeleton frame adapted for insertion and movement within the hold of a vessel, a grain hopper supported on said frame and provided with a downwardly and outwardly inclined outlet spout, a fan casing mounted on said frame beneath said hopper having a peripheral outlet duct disposed beneath and located on the same side of said frame as said outlet spout, a manifold disposed at one side of said frame consisting of an air intake duct at one end and a discharge conduit at the opposite end thereof, and a grain conduit disposed between said air duct and discharge conduit and extending at an incline from said manifold, said grain conduit connected to said hopper spout for delivery of grain from said hopper to said manifold, said manifold having a mixing chamber disposed adjacent said air intake duct and in proximity to said fan casing outlet duct, means for connecting said air intake duct of said manifold to said fan casing outlet duct, said connecting means and said connection between said hopper spout and grain conduit supporting said manifold on said frame, venturi means disposed in said manifold between said fan and said grain duct, and a high capacity fan in said fan casing for moving air at high speed through said manifold for creating a suction on the grain delivered by said grain conduit and conveying the grain from said manifold through said manifold discharge conduit.

3. In a grain trimmer, the combination of a skeleton frame for insertion and movement within the hold of a vessel, a grain hopper mounted on said frame having a downwardly and outwardly inclined discharge spout extending toward one side of said frame, a fan casing mounted on said frame beneath said hopper and having a peripheral outlet duct disposed beneath and located on the same side of said frame as said discharge spout, a manifold disposed at one side of said frame and having an air intake duct at one end, a discharge conduit at the opposite end thereof, and a grain conduit disposed between said air duct and said discharge conduit of said manifold and extending upwardly at an incline, said grain conduit connected to said hopper spout and having supporting engagement therewith, means for connecting said air duct of said manifold to said air outlet duct of said fan casing for supporting said manifold on said frame and providing communication between said fan casing and said manifold, a damper adjustably disposed within said manifold at the discharge end of said grain conduit for directing the grain delivered to said manifold toward said discharge conduit of said manifold and providing a venturi in said manifold, and a high speed fan mounted in said fan casing for the delivery of air to and through said manifold and for drawing the grain into and conveying the grain through said manifold.

GEORGE E. TONER.

REFERENCES CITED

The following references are of record in the file of this patent:

UNITED STATES PATENTS

| Number | Name | Date |
| --- | --- | --- |
| 654,509 | Bonham | July 24, 1900 |
| 772,124 | Benedict et al. | Oct. 11, 1904 |
| 957,126 | Tilley | May 3, 1910 |
| 1,486,883 | Halliburton | Mar. 18, 1924 |
| 1,618,155 | Thomas | Feb. 15, 1927 |
| 1,821,714 | Kaltenbrunn | Sept. 1, 1931 |
| 1,868,035 | Valstar | July 19, 1932 |
| 2,216,704 | Flanagan | Oct. 1, 1940 |